(12) United States Patent
Hwang

(10) Patent No.: US 10,833,817 B2
(45) Date of Patent: Nov. 10, 2020

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Hyunchul Hwang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 77 days.

(21) Appl. No.: 16/209,499

(22) Filed: Dec. 4, 2018

(65) Prior Publication Data

US 2020/0076542 A1    Mar. 5, 2020

(30) Foreign Application Priority Data

Sep. 4, 2018  (KR) .................. 10-2018-0105289

(51) Int. Cl.
| | |
|---|---|
| G06F 11/00 | (2006.01) |
| H04L 1/18 | (2006.01) |
| H04L 1/24 | (2006.01) |
| G06F 11/14 | (2006.01) |
| B60W 50/02 | (2012.01) |
| B60W 50/04 | (2006.01) |
| B60W 50/14 | (2020.01) |

(52) U.S. Cl.
CPC ......... *H04L 1/189* (2013.01); *B60W 50/0205* (2013.01); *B60W 50/045* (2013.01); *G06F 11/1443* (2013.01); *H04L 1/1809* (2013.01); *H04L 1/24* (2013.01); *B60W 2050/146* (2013.01)

(58) Field of Classification Search
CPC ......... H04L 1/189; H04L 1/24; H04L 1/1809; H04L 1/203; G06F 11/1443; B60W 50/0205; B60W 50/045; B60W 2050/146
USPC .................................................. 370/241, 242
See application file for complete search history.

(56) References Cited

U.S. PATENT DOCUMENTS

| | | | |
|---|---|---|---|
| 2015/0220401 A1* | 8/2015 | Jiang ................... | G06F 11/1441 714/23 |
| 2016/0167653 A1* | 6/2016 | Malone ................. | B60W 50/12 701/23 |
| 2016/0280231 A1* | 9/2016 | Winblad Von Valter .................... B60W 50/0205 |
| 2017/0026198 A1* | 1/2017 | Ochiai ................. | H04B 1/3822 |

(Continued)

*Primary Examiner* — Chuong T Ho
(74) *Attorney, Agent, or Firm* — Brinks Gilson & Lione

(57) ABSTRACT

A vehicle includes a plurality of controllers configured to control operation of at least one load and share information with each other; a communication module configured to perform communication between the at least one load and the plurality of controllers; and a plurality of connectors provided between the plurality of controllers, the at least one load, and the communication module, configured to connect the plurality of controllers, the at least one load, and the communication module. One of the plurality of controllers may transmit a preset number of times of communication signals to the other controller and the communication module when the information is not received for a predetermined time, store the number of times of reception of response signals as error information, and transmit the stored error information to the outside when receiving an error information transmission command from the outside.

17 Claims, 11 Drawing Sheets

(56) References Cited

U.S. PATENT DOCUMENTS

| | | | |
|---|---|---|---|
| 2017/0244594 A1* | 8/2017 | Shiota | H04L 43/16 |
| 2018/0074929 A1* | 3/2018 | Kito | G06F 11/3051 |
| 2018/0218158 A1* | 8/2018 | Amano | H04W 12/12 |
| 2019/0052677 A1* | 2/2019 | Wakita | H04L 63/302 |

* cited by examiner

FIG. 6A

| FIRST CONTROLLER | SECOND CONTROLLER | THIRD CONTROLLER | FOURTH CONTROLLER | GATEWAY |
|---|---|---|---|---|
| ERROR CODE (Time-out) | 10 | 10 | 2 | 1 |

FIG. 6B

| FIRST CONTROLLER | SECOND CONTROLLER | THIRD CONTROLLER | FOURTH CONTROLLER | GATEWAY |
|---|---|---|---|---|
| ERROR CODE (Time-out) | 1 | 1 | 3 | 10 |

FIG. 6C

| FIRST CONTROLLER | SECOND CONTROLLER | THIRD CONTROLLER | FOURTH CONTROLLER | GATEWAY |
|---|---|---|---|---|
| ERROR CODE (Time-out) | 10 | 3 | 2 | 1 |

FIG. 7

| FIRST CONTROLLER | SECOND CONTROLLER | THIRD CONTROLLER | FOURTH CONTROLLER | GATEWAY |
|---|---|---|---|---|
| ERROR CODE (Bus off) | 3 | 3 | 3 | 3 |

FIG. 8

| COMMUNICATION WITH FIRST CONTROLLER | |
|---|---|
| SECOND CONTROLLER | RECEIVE TEN TIMES |
| THIRD CONTROLLER | RECEIVE TEN TIMES |
| FOURTH CONTROLLER | RECEIVE TWO TIMES |
| GATEWAY | RECEIVE ONE TIME |

* TIME-OUT BETWEEN THIRD CONTROLLER AND FOURTH CONTROLLER

| COMMUNICATION WITH FIRST CONTROLLER | | |
|---|---|---|
| SECOND CONTROLLER | RECEIVE TEN TIMES | * TIME-OUT BETWEEN THIRD CONTROLLER AND FOURTH CONTROLLER |
| THIRD CONTROLLER | RECEIVE TEN TIMES | |
| FOURTH CONTROLLER | RECEIVE TWO TIMES | |
| GATEWAY | RECEIVE ONE TIME | |

•
•
•

| COMMUNICATION WITH FOURTH CONTROLLER | | |
|---|---|---|
| THIRD CONTROLLER | RECEIVE ONE TIME | * TIME-OUT BETWEEN THIRD CONTROLLER AND FOURTH CONTROLLER |
| SECOND CONTROLLER | RECEIVE ONE TIME | |
| FIRST CONTROLLER | RECEIVE THREE TIMES | |
| GATEWAY | RECEIVE TEN TIMES | |

| COMMUNICATION WITH GATEWAY | | |
|---|---|---|
| FOURTH CONTROLLER | RECEIVE TEN TIMES | * TIME-OUT BETWEEN THIRD CONTROLLER AND FOURTH CONTROLLER |
| THIRD CONTROLLER | RECEIVE THREE TIMES | |
| SECOND CONTROLLER | RECEIVE TWO TIMES | |
| FIRST CONTROLLER | RECEIVE ONE TIME | |

VEHICLE AND METHOD FOR CONTROLLING THE SAME

CROSS-REFERENCE TO RELATED APPLICATION(S)

The present application claims priority to and the benefit of Korean Patent Application No. 10-2018-0105289, filed on Sep. 4, 2018, which is incorporated by reference in its entirety.

TECHNICAL FIELD

Forms of the present disclosure relate to a vehicle for diagnosing a communication error, and a method for controlling the same.

BACKGROUND

The statements in this section merely provide background information related to the present disclosure and may not constitute prior art.

A vehicle is an apparatus to drive on a road by driving of vehicle wheels for the purpose of transporting people or cargo.

The vehicle may perform basic traveling functions and additional functions for user convenience, for example, an audio function, a video function, a navigation function, an air-conditioning control function, a seat heating function, a communication function with an external terminal, and the like.

As such, as in-vehicle electronic control devices and multimedia devices are increased, an enormous cable may be required to interconnect the separated devices. This takes up a significant portion of the overall vehicle weight and manufacturing cost, leading to a decrease in reliability and an increase in factors causing quality problems.

Thus, by using a Controller Area Network (CAN) that connects all the electronic devices to one common network bus, it reduces the amount of wiring and manufacturing cost in the vehicle.

In other words, the vehicle is equipped with various controllers that perform independent functions. The controllers may be connected through a CAN communication bus (CAN_H) (CAN_L), and control information of each of the various controllers may be shared with each other by transmitting/receiving the control information of each of the various controllers by a CAN controller provided in each of the various controllers. At this time, when an error (bit error, form error, etc.) occurs during transmission/reception of the control information of each of the various controllers, retransmission or ignoring of the reception signal may be performed.

In this way, in the transmission/reception of the control information through the CAN communication bus, there is a case where the control information cannot be transmitted/received due to failure of the controllers or disconnection/short circuit of a CAN communication line. Such a fault is collectively referred to as "CAN communication error."

When the CAN communication error occurs, the network is adversely influenced, so that the bus line is in a communication disabled state. This causes a problem that prevents the behavior of the vehicle from being actively controlled.

A communication error may occur intermittently in a communication line or a connector due to the external environment or the like while the vehicle is driving. At this time, there is a case where the communication error is solved when a user recognizes the communication error and visits a service center, and there is a problem that the cause of the communication error and the location where the communication error occurs from cannot be known. For example, there has been a problem where an error caused by high temperature during driving of the vehicle does not appear due to a temperature drop that is, the error is not generated by high temperature resolution when the user visits the service center.

SUMMARY

Therefore, it is an aspect of the present disclosure to provide a vehicle capable of including a plurality of controllers and a connector for connecting the plurality of controllers, and recognizing and storing a position where a connection error has occurred between the controllers during driving, and a method for controlling the same.

It is another aspect of the present disclosure to provide a vehicle capable of controlling an output of a connection error based on a risk of the connection error, and a method for controlling the same.

It is another aspect of the present disclosure to provide a vehicle capable of transmitting time-out, bus off, and a message error to a diagnostor when a diagnostor is connected, and a method for controlling the same.

Additional aspects of the disclosure will be set forth in part in the description which follows and, in part, will be obvious from the description, or may be learned by practice of the disclosure.

In accordance with an aspect of the present disclosure, a vehicle includes: a plurality of controllers configured to control operation of at least one load and share information with each other; a communication module configured to perform communication between the at least one load and the plurality of controllers; and a plurality of connectors provided between the plurality of controllers, the at least one load, and the communication module, configured to connect the plurality of controllers, the at least one load, and the communication module. One of the plurality of controllers may transmit a preset number of times of communication signals to the other controller and the communication module when the information is not received for a predetermined time while a vehicle is driving, store the number of times of reception of response signals transmitted from the other controller and the communication module as error information, and transmit the stored error information to the outside when receiving an error information transmission command from the outside.

The communication module may communicate with a diagnostor and transmit the error information stored in any one of the controllers to the diagnostor.

The plurality of controllers may include a memory configured to store identification information of the plurality of controllers and identification information of the communication modules and store the arrangement information of the plurality of controllers and the communication modules and transmission order of communication signals; and at least three of the controllers. The one of the controllers may sequentially transmit the preset number of times of communication signals to at least two of the controllers and the communication module based on the transmission order of the communication signals.

The one of the controllers may count the number of times of reception of the response signal received from at least one device when the response signal is received from at least one of the at least two of the controllers and the communication module, and recognize and store an error code based on the number of times of reception of the response signal of the at least two of the controllers and the number of times of reception of the response signal of the communication module.

The communication module may communicate with a diagnostor. The any one of the controllers may transmit to the diagnostor the number of times of reception of the response signal of the at least two of the controllers, the number of times of reception of the response signal of the communication module, and the recognized error code when the error information transmission command is received from the diagnostor.

The one of the controllers may identify a device having the number of reception times smaller than the preset number of times among the number of times of reception of the response signal of the at least two of the controllers and the number of times of reception of the response signal of the communication module, and determine the connector that generated a communication error based on identification information of the identified device and arrangement information.

The one of the controllers may recognize the error code as a bus off when both the number of times of reception of the response signal of the at least two of the controllers and the number of times of reception of the response signal of the communication module are smaller than the preset number of times and the number of times of reception of the response signal of the at least two of the controllers is equal to the number of times of reception of the response signal of the communication module.

The one of the controllers may recognize the error code as a time-out when both the number of times of reception of the response signal of the at least two of the controllers and the number of times of reception of the response signal of the communication module are smaller than the preset number of times and the error range of the number of times of reception of the response signal of the at least two of the controllers and the number of times of reception of the response signal of the communication module exceed the reference error range.

The one of the controllers may recognize the error code as a time-out when some part among the number of times of reception of the response signal of the at least two of the controllers and the number of times of reception of the response signal of the communication module is smaller than the preset number of times.

The vehicle may further include: a detector configured to detect a state of the vehicle. The one of the controllers may recognize the error code as a message error when detection information that is out of the normal range is received and recognize the error code as the message error when state information different from the actual state of the vehicle is received.

The vehicle may further include: a display. The one of the controllers may determine the danger level of communication error based on the error information, control the display to display the error information when the danger level is equal to or higher than the reference level, identify the number of occurrences of the error information, and control the display to display the error information when the identified number of times is equal to or higher a reference number of times.

In accordance with another aspect of the present disclosure, a method for controlling a vehicle including a plurality of controllers each connected through a connector to a communication line between at least one load and a gateway, the method includes: controlling the operation of the at least one load through information sharing between the plurality of controllers during driving of the vehicle; recognizing error information when it is determined that a communication error has occurred in at least one of the plurality of controllers and the gateway; and transmitting the error information to a diagnostor when an error information transmission command is received from the diagnostor. The recognizing of the error information may include recognizing the error information by the controller that has not received information for a predetermined time among the plurality of controllers. The controller that has not received information for the predetermined time may transmit a preset number of times of communication signals to the other controller and the gateway, count the number of times of reception of the received response signal for each device when a response signal transmitted from the other controller and the gateway is received, recognize an error code based on the counted number of times of reception of the response signal for each device, and store the counted number of times of reception of the response signal for each device and the recognized error code as the error information.

The plurality of controllers may include at least three of the controllers. The transmitting of the preset number of times of communication signals may include sequentially transmitting the preset number of times of communication signals to at least two of the controllers and the gateway by one of the controllers based on the transmission order of the communication signals stored in a memory.

The recognizing of the error code may include counting the number of times of reception of the response signal received from at least one device by the one of the controllers when the response signal is received from at least one of the at least two of the controllers and the gateway; recognizing the error code as a bus off when both the number of times of reception of the response signal of the at least two of the controllers and the number of times of reception of the response signal of the communication module are smaller than the preset number of times and the number of times of reception of the response signal of the at least two of the controllers is equal to the number of times of reception of the response signal of the communication module; and recognizing the error code as a time-out when some part among the number of times of reception of the response signal of the at least two of the controllers and the number of times of reception of the response signal of the communication module is smaller than the preset number of times.

The recognizing of the error code may include recognizing the error code as a time-out when both the number of times of reception of the response signal of the at least two of the controllers and the number of times of reception of the response signal of the communication module are smaller than the preset number of times and the error range of the number of times of reception of the response signal of the at least two of the controllers and the number of times of reception of the response signal of the communication module exceed the reference error range.

The method may further include: through the one of the controllers, identifying a device having the number of reception times smaller than the preset number of times among the number of times of reception of the response signal of the at least two of the controllers and the number of times of reception of the response signal of the communication module; and determining the connector that generated a communication error based on identification information of the identified device and arrangement information.

The recognizing of the error code may include detecting an actual state of the vehicle; recognizing the error code as a message error when detected information on the detected actual state of the vehicle is out of the normal range; and recognizing the error code as the message error when state information different from the actual state of the vehicle is received.

In accordance with another aspect of the present disclosure, a vehicle includes: at least one load; a gateway connected to the at least one load through a communication line; a plurality of controllers each connected through a connector to the communication line, configured to control the at least one load; and a memory configured to store arrangement information of the plurality of controllers and the gateway. At least one of the controllers of the plurality of controllers may transmit communication signals to the other controller and the gateway when the communication is impossible for a predetermined time, identify the number of times of reception of response signals transmitted from the other controller and the gateway, determine the position of the connector where a connection error has occurred based on the number of times of reception of the identified response signals and the arrangement information, and store the determined position of the connector.

The memory may store identification information of the plurality of controllers, identification information of the gateway and transmission order of communication signals. The at least one of the controllers may sequentially transmit the preset number of times of communication signals to the other controller and the gateway based on the transmission order of the communication signals, recognize an error code as a bus off when the number of times of reception of the response signal of the other controller sequentially received and the number of times of reception of the response signal of the gateway are both the same, and recognize the error code as a time-out when the number of times of reception of the response signal of the other controller sequentially received and the number of times of reception of the response signal of the gateway are different from each other.

The at least one of the controllers may recognize the error code based on the number of times of reception of the identified response signal, store the recognized error code as error information, and transmit to a diagnostor the position of the connector where a connection error has occurred and the error code when an error information transmission command is received from the diagnostor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6A, 6B and 6C are views illustrating the number of times a response signal is received when time-out occurs during a communication error of the vehicle in one form of the present disclosure;

FIG. 7 is a view illustrating the number of times a response signal is received when a bus off occurs during a communication error of the vehicle in one form of the present disclosure; and FIGS. 8 and 9 are views illustrating display of error information of a diagnostor communicating with the vehicle in one form of the present disclosure.

Figure 1:
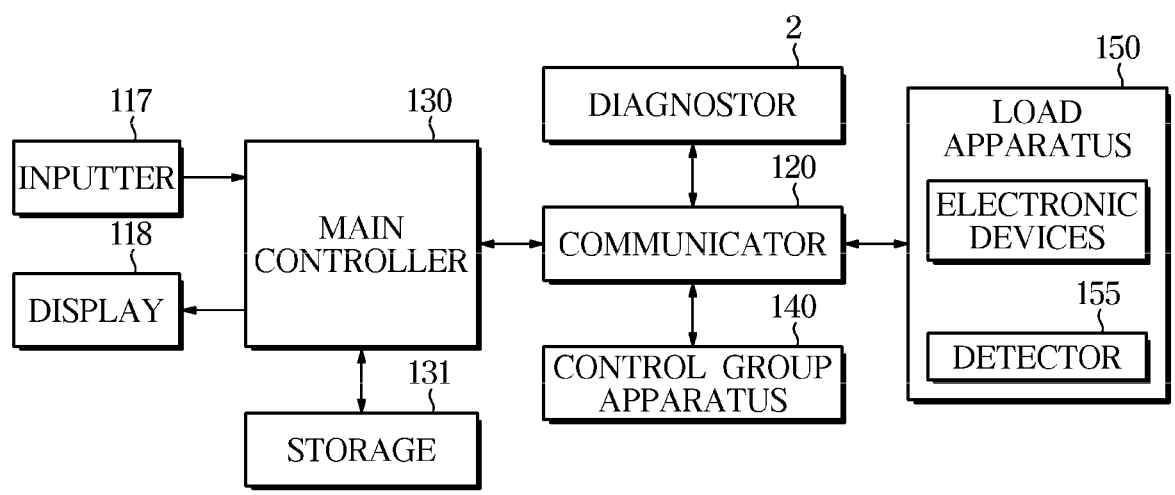
FIG. 1 is a control block diagram of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and some forms of the present disclosure will be described with reference to the accompanying drawings.

Figure 2:
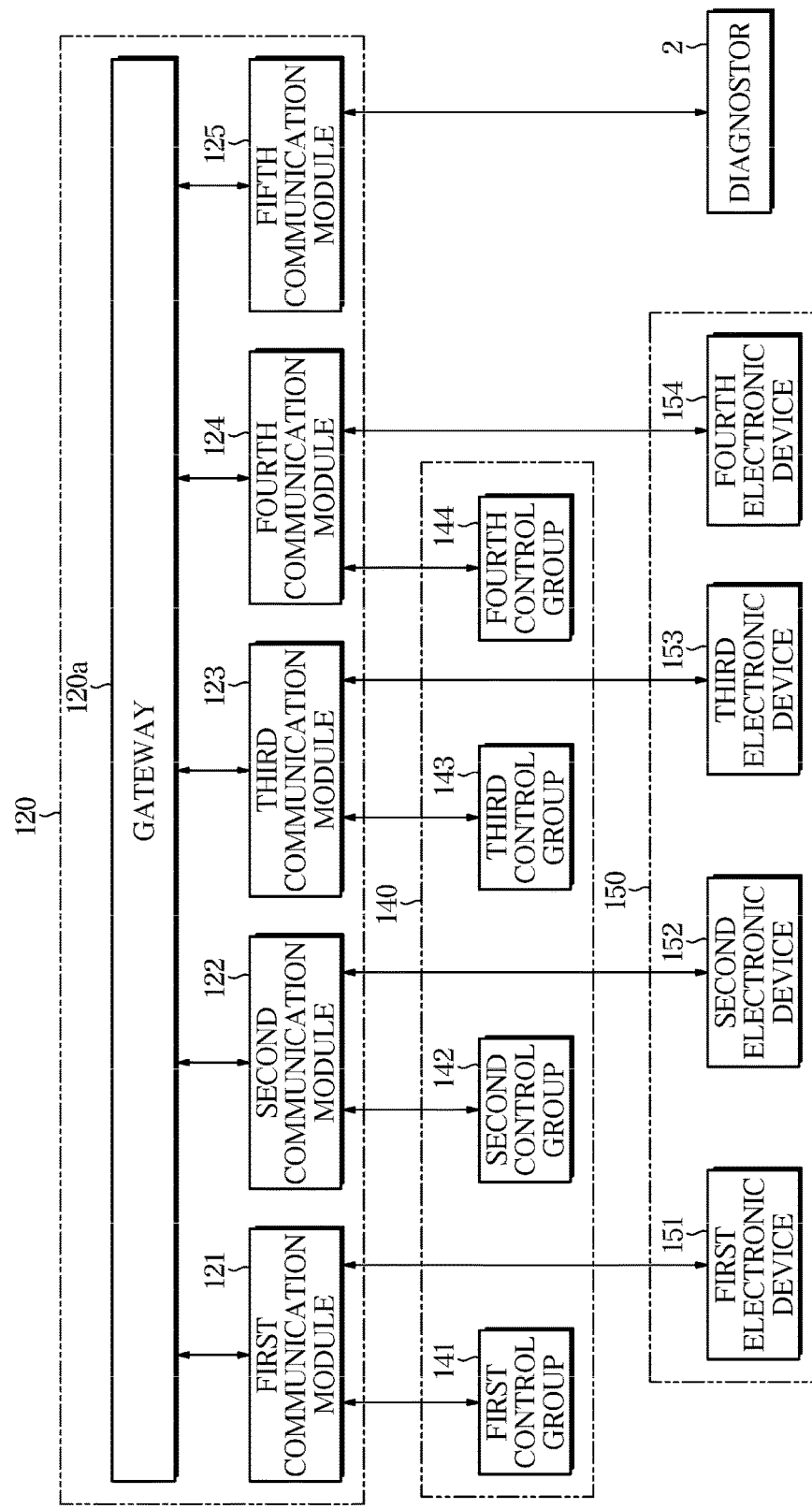
FIG. 2 is a detailed block diagram of a communicator, a plurality of controllers, and a load apparatus provided in the vehicle in one form of the present disclosure.

FIG. 1 is a control block diagram of a vehicle in one form of the present disclosure, and FIG. 2 is a detailed block diagram of a communicator, a plurality of controllers, and a load apparatus provided in the vehicle in one form of the present disclosure;

A vehicle 1 may include a body with exterior and interior parts, and chassis on which mechanical devices required for driving are installed.

The exterior parts of the body may include a front bumper, a hood, a roof panel, a rear bumper, a trunk, front, back, left and right doors, and window glass. The exterior part of the body may further include side mirrors for providing views behind the vehicle 1.

The interior parts of the body may include seats for people to sit thereon, a dashboard, an instrument cluster (or cluster) placed on the dashboard containing gauges and indicators, such as a tachometer, speedometer, water temperature gauge, fuel gauge, turn signal indicator, head light indicator, warning light, seat belt warning light, odometer, tachograph, gearshift position indicator, door open warning light, low fuel warning light, low oil pressure warning light, etc., a steering wheel for steering the direction of the vehicle 1, and a center fascia extending from the dashboard to an area between the seats.

The seats may be provided with heating wires for supplying heat and ventilation devices for circulating air.

A head unit may be provided in the center fascia.

The head unit may be connected to various loads for performing an audio function, radio function, air conditioning function, seat heating wires function, ventilation function, navigation function, Digital Multimedia Broadcasting (DMB) function, and telephone function, and receive an operation command for performing each function and control the operation of each function based on the inputted operation command or transmit the operation command to the corresponding load.

The vehicle 1 may further include an inputter for receiving the operation command of at least one of a plurality of functions that can be performed in the vehicle 1. The vehicle 1 may further include a display for displaying information on an activated function, information input by a user, and displaying communication error information.

The inputter may be provided in the head unit or the center fascia, including at least one mechanical button, such as ON/OFF buttons for operation of various functions, buttons to change the settings of various functions, etc.

The inputter may also include a jog dial (not shown) or touch pad for the user to input a command to move or select a cursor displayed on the display of a terminal.

The display may be a flat panel display device such as a Liquid Crystal Display (LCD), an Organic Light Emitting Diode (OLED), or a Plasma Display Panel (PDP).

The vehicle 1 may be provided with a vehicle terminal.

The vehicle terminal may include the inputter and the display, and perform at least one selected function when at least one function of the navigation function, the DMB function, the audio function, the video function, the telephone function, and the radio function is selected and display operation information about the activated function.

The inputter of the terminal may include a touch panel integrally provided on the display of the terminal.

The inputter of the terminal may be activated and displayed in a button shape on the display of the terminal, and the position information of the displayed button may be received.

The inputter and the display of the terminal may be provided with a touch screen.

The vehicle 1 may include an electronic control unit (ECU) for controlling an electronic device such as a seat position adjusting device, a seat heating wire and ventilation device, an opening and closing device of the window glass, a door opening and closing device, an angle adjusting device of the side mirrors, the cluster, the head unit, and the vehicle terminal.

The chassis of the vehicle 1 may further include a power generating device, a power transmitting device, a driving device, a steering device, a braking device, a suspension device, a transmission device, a fuel device, and front and rear left and right wheels.

The vehicle 1 may include the ECU for controlling the electronic devices such as the power generating device, the power transmitting device, the driving device, the steering device, the braking device, the suspension device, the transmission device, the fuel device, various safety devices, and various sensors.

Here, the ECU (hereinafter, referred to as a controller) may be provided for each of the electronic devices, or may be provided so as to integrally control a plurality of the electronic devices.

The vehicle 1 may include a communicator 120 for performing communication between the various electronic devices therein.

The communicator 120 may communicate with a user terminal and communicate with a server (not shown) and a base station (not shown). The communicator 120 may perform position tracking, internet access, accident information provision, and traffic information service using a communication network and a broadcasting network.

The communicator 120 may include one or more components that enable communication with an external device, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (Wibro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The communicator 120 may further include a Global Positioning System (GPS) receiver for obtaining position information from a satellite.

The control configuration of the vehicle 1 will be described in more detail with reference to FIGS. 2 and 3.

Referring to FIG. 1, the vehicle 1 may include an inputter 117, a display 118, the communicator 120, a main controller 130, a storage 131, a control group apparatus 140 and a load apparatus 150.

The inputter 117 may receive an output command for confirming error information and a transmission command for transmitting the error information.

The display 118 may display the error information. The error information may include identification information and an error code of the controller in which the error occurred, and may further include an error code name.

The communicator 120 may be connected to the main controller 130 and a plurality of controllers for controlling various loads of the vehicle 1 by wire, and may transmit and receive control signals between different controllers through the wire.

The load may include the electronic device for performing at least one function and may further include a detector for detecting at least one piece of information about the condition of the vehicle 1.

The communicator 120 of the present disclosure will be described with reference to the CAN communication module among the wired communication modules.

The CAN communication module may transmit a control signal to at least one of the controllers, the electronic device, and the detector through a high line and a low line, which are two communication lines, and may transmit thousands of signals per second at the time of signal transmission.

The CAN communication module may be classified into a low-speed CAN communication module and a high-speed CAN communication module according to the communication speed at which control signals are transmitted and received.

Here, the low-speed CAN communication module may be a communication module having a communication speed lower than a reference speed, and the high-speed CAN communication module may be a communication module having a communication speed higher than the reference speed.

The low-speed CAN communication module may include a Multimedia Controller Area Network (M-CAN) communication module and a Body Controller Area Network (B-CAN) communication module for transmitting/receiving signals for operating the various electronic devices.

The high-speed CAN communication module may include a Power Train Controller Area Network (P-CAN) communication module for transmitting and receiving signals for controlling a powertrain, stability control (ABS, active suspension, etc.) and the transmission function in real time, and a Chassis Controller Area Network (C-CAN) communication module, and may include a Diagnostic Controller Area Network (D-CAN) communication module for diagnosing errors.

The main controller 130 may control communication between the plurality of controllers provided in the vehicle 1, manage the plurality of controllers, and control operations of the plurality of controllers. The main controller 130 may also control communication with a diagnostor 2.

The main controller 130 may control the operation of the display 118 to display the error information stored in the storage 131 through the display 118 when the output command inputted to the inputter 117 is received. The main controller 130 may control the operation of the communicator 120 to transmit the error information stored in the storage 131 through the communicator 120 when the transmission command inputted to the inputter 117 is received.

The main controller 130 may control the operation of the display 118 to output information about the connection request of the diagnostor 2 when the transmission command inputted to the inputter 117 is received and determine whether or not the communicator 120 and the diagnostor 2 are normally connected by checking the possibility of communicating with the diagnostor 2.

The main controller 130 may control the operation of the communicator 120 to transmit the error information stored in the storage 131 to the diagnostor 2 through the communicator 120 when the transmission command of the error information from the diagnostor 2 is received.

The main controller 130 may request transmission of the error information to the plurality of controllers when the output command of the error information is received or the transmission command of the error information is received, receive the error information from at least one of the controllers of the plurality of controllers, and control the operation of the communicator 120 to transmit the received error information to the diagnostor 2.

The main controller 130 may store the received error information in the storage 131 when the error information is received from the at least one of the controllers.

When a communication signal for error diagnosis is received from the at least one of the controllers, the main controller 130 may transmit a response signal corresponding to the received communication signal to the at least one of the controllers.

The main controller 130 may determine that communication error due to time-out or bus off occurred when the control signal is not received from the at least one of the controllers in any one of the control groups.

When the main controller 130 receives a message for state information different from the actual state of the vehicle 1 from the at least one of the controllers in one control group or receives a message for detection information that is out of the normal range, the main controller 130 may determine that the communication error due to message error has occurred.

For example, the message received for information different from the actual state of the vehicle 1 may include that neutral information or backward information is received from the position information of a transmission lever in the forward driving state of the vehicle 1.

The message received for the detection information that is out of the normal range may include that non-output vehicle speed information is received from the vehicle 1, or non-output RPM information is received from the vehicle 1, and may include receiving a high or low room temperature that is difficult for persons to adapt to.

In addition, since the message error can be caused by a failure of the controller, when the communication is normal during the error diagnosis, the controller may be determined as the failure.

The main controller 130 may determine whether the vehicle is in a driving state based on the detection information detected by a detector 155, determine whether or not the error has occurred due to communication when it is determined that the vehicle 1 is in the driving state, and store the error information about the generated error when it is determined that the error due to communication during driving has occurred.

The main controller 130 may transmit the driving information corresponding to the driving state to the plurality of controllers. That is, the main controller 130 may transmit information indicating that the vehicle 1 is driving to the plurality of controllers.

The main controller 130 may transmit the communication signal for error diagnosis to each of the plurality of controllers in a control group to which the at least one of the controllers belongs when the control signal is not received from the at least one of the controllers during driving, and transmit the communication signal by a preset number of times.

When the main controller 130 transmits the communication signal to the plurality of controllers, the main controller 130 may sequentially transmit the communication signal from the controller located close to the main controller 130.

The main controller 130 may transmit the communication signal to the at least one of the controllers at a preset period when the control signal is not received from the at least one of the controllers during driving, and transmit the communication signal by the preset number of times.

The main controller 130 may identify the number of times of the received response signals when the response signal transmitted from any one of the controllers is received, determine that any one of the controllers is a normal state when the number of times of the received response signals is the preset number of times. The main controller 130 may determine that any one of the controllers is the communication and store the error information about any one of the controllers.

The determination of the communication error of any one of the controllers may include determination of a connection failure of a connector connected to any one of the controllers, a short of the connector, or a short of the wire of the CAN communication.

The main controller 130 may identify a danger level of the received error information when the error information about any one of the controllers is received and control the output of the received error information when the danger level of the received error information is the danger level for immediate output. For example, the main controller 130 may control the output of the received error information when the danger level of the received error information among the upper, middle, and lower danger levels is at the upper level. The upper level may be a reference level for indicating a danger.

The main controller 130 may identify number of times of occurrences of the received error information when the error information about any one of the controllers is received and control the output of the received error information when the number of times of occurrences is equal to or higher than the reference number of times.

When the plurality of controllers in the any one of control groups are determined to be in the normal state, in a state where the communication error has occurred in any one of the control groups, the main controller 130 may determine that the communication error of a load controlled by any one of the control groups.

The main controller 130 may be implemented with a memory (not shown) storing an algorithm to control operation of the components in the vehicle 1 or data about a program that implements the algorithm, and a processor (not shown) carrying out the aforementioned operation using the data stored in the memory. The memory and the processor may be implemented in separate chips. Alternatively, the memory and the processor may be implemented in a single chip.

The storage 131 may store the error information.

The error information may be information about an error that occurred during driving.

The error information may include the identification information and the error code of the controller in which the error occurred, and may further include an error code name, and may include the number of times of reception of the signal of the controller in the same control group.

The error information may include the identification information and the error code of the controller in which the error occurred, and may further include the error code name, and may include the number of times of reception of the signal of the controller in the same control group.

The storage 131 may store identification information of the plurality of controllers for each of the control groups, and may store the arrangement order of the plurality of controllers for each of the control groups. In other words, the storage 131 may store the arrangement order of the plurality of controllers in the order close to a gateway based on the gateway, or may store the arrangement order of the plurality of controllers in the order of the closest order in the electronic device based on the electronic device.

The storage 131 may store the identification information of the plurality of controllers included in the same control group, the arrangement order matched with the identification information of the plurality of controllers, and may store the gateway arrangement position between the plurality of controllers.

The storage 131 may store the danger level for each error.

The storage 131 may store the danger level for output immediately after the error occurs and store the reference number of times.

The storage 131 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto. The storage 131 may be a memory implemented with a chip separate from the aforementioned processor in relation to a controller 160, or may be implemented integrally with the processor in a single chip.

The control group apparatus 140 may include a plurality of the control groups.

The plurality of control groups may be connected to different communication modules, respectively.

Each of the control groups may include the plurality of controllers, and control the operation of at least one load using the plurality of controllers.

The load apparatus 150 may include a plurality of loads. The plurality of loads may include electronic devices 151-154 for performing at least one function, and may further include the detector 155 for detecting at least one piece of information.

The detector 155 may include a speed detector for detecting the driving speed of the vehicle 1.

The speed detector may be a wheel speed sensor provided on front, rear, left, and right wheels, or an acceleration sensor for detecting the acceleration of the vehicle 1.

The other detector 155 may further include at least one of a plurality of distance sensors for detecting distances to other peripheral vehicles and obstacles, an angular velocity sensor for detecting the angular velocity of the steering wheel for detecting the steering angle of the vehicle 1, a yaw rate sensor for detecting a yaw moment of the vehicle 1, an illuminance sensor for detecting an external illuminance, and a door open/close sensor.

As illustrated in FIG. 2, the communicator 120 may include a gateway 120*a* and a plurality of communication modules 121 to 125. The plurality of communication modules 121 to 125 may be provided in the gateway 120*a*.

The gateway 120a may communicate with the plurality of communication modules 121 to 125 in the communicator 120 and control communication of the plurality of communication modules 121 to 125.

The gateway 120a may be provided in the main controller 130.

The gateway 120a may transmit a response signal to any one of the controllers when the communication signal for error diagnosis is received from any one of the controllers.

When the control signal is not received from any one of the controllers, the gateway 120a may transmit the communication signal of the preset number of times to the plurality of controllers in the control group to which any one of the controllers belongs, at preset time intervals, and store the number of times the response signal is received for each of the controllers.

The gateway 120a may identify the controller having the number of times of reception of the response signals of the plurality of controllers less than the preset number of times, recognize the connection failure of the connector based on the identified position information of the controller, and store the error code as the time-out when the number of times of reception of the response signals of some of the plurality of controllers is the preset number of times.

The gateway 120a may also store the error code as the time-out when the number of times the response signals of at least two of the controllers among the plurality of controllers is different from each other.

When the identification information and the control signal of the controller are received from the controllers of some of the plurality of controllers in any one of the control groups, the gateway 120a may determine that the communication error related to the time-out has occurred in at least one of the remaining controllers based on the arrangement information of the plurality of controllers.

When the response signal is not received from the plurality of controllers for a predetermined time, the gateway 120a may determine the error code as a bus off and store the determined error code.

When the number of times of reception of the response signals of the plurality of controllers is less than the preset number of times and the number of times of reception of the response signals of the plurality of controllers are all the same or similar, the gateway 120a may determine the error code as the bus off and store the determined error code and the number of reception times of the response signal for each of the controllers.

For example, when the number of times that the response signals of five of the controllers for the communication signal transmitted ten times is all three times, the gateway 120a may determine that the communication error is about the bus off. When the number of times of reception of the response signals of three of the controllers among the five controllers is three times and the number of times of reception of the response signals of the remaining one controller is four times and the number of times of reception of the response signal of the last one controller is two times, the gateway 120a may determine that the error code is about the bus off.

When a message about state information different from the actual state of the vehicle 1 is received from the at least one of the controllers in any one of the control groups or the message about detection information that is out of the normal range is received, the gateway 120a may store the error code as the message error.

When it is determined that the message error has occurred, the gateway 120a may sequentially transmit the communication signal to the plurality of controllers in any one of the control groups, determine the controller that has generated the message error based on the response signal of the received at least one of the controllers, and store identification information of the determined at least one of the controllers and the error code for the message error.

The gateway 120a may store a transmission order of communication signals for each of the control groups for transmitting the communication signal for error diagnosis when the communication error occurs. For example, the gateway 120a may store the order of a fourth controller→a third controller→a second controller→a first controller in a first control group, and may store the order of a seventh controller→a sixth controller→a fifth controller in a second control group. That is, the gateway 120a may transmit the communication signal from the controller disposed closest to the gateway.

The plurality of communication modules 121 to 125 may be communication modules of different types.

In addition, the plurality of communication modules 121 to 125 may all be CAN communication modules, and may be communication modules having different communication speeds and uses.

The plurality of CAN communication modules 121 to 125 may include the Multimedia Controller Area Network (M-CAN) communication module, the Body Controller Area Network (B-CAN) communication module for transmitting/receiving signals for operating various electronic devices, the Power Train Controller Area Network (P-CAN) communication module for transmitting and receiving signals for controlling the powertrain, the stability control (i.e., ABS, active suspension, etc.) and the transmission function in real time, and the Chassis Controller Area Network (C-CAN) communication module, and the Diagnostic Controller Area Network (D-CAN) communication module for diagnosing errors.

The two wires of the CAN communication module may be connected to the at least one of the controllers and may be connected to the electronic device for controlling operation by the at least one of the controllers, and may be connected to the detector (i.e., sensors) for controlling operation by the at least one of the controllers and for transmitting the detected signal.

One of the CAN communication modules may be connected to the controller, the electronic device and the detector which require the same communication method and the communication speed within the same range. The at least one of the controllers, the electronic device and the detector connected to two wires of the one of the CAN communication modules may be connected to each other by the connector.

The two wires of the CAN communication module may be connected to the diagnostor 2. The diagnostor 2 may be detachably connected.

The control group apparatus 140 may include a plurality of control groups 141 to 144, and each of the control groups may control the operation of at least one load (i.e., the electronic device or the detector).

The plurality of electronic devices, that is, first to fourth electronic devices, will be described as an example.

As illustrated in FIG. 2, the gateway 120a may be electrically, communicatively, and mechanically connected to the first communication module 121, the second communication module 122, the third communication module 123, the fourth communication module 124 and the fifth communication module 125.

The first communication module 121 may be connected to the first control group 141 and the first electronic device 151 that performs first CAN communication. The second communication module 122 may be connected to the second control group 142 and the second electronic device 152 that performs second CAN communication. The third communication module 123 may be connected to the third control group 143 and the third electronic device 153 that performs third CAN communication. The fourth communication module 124 may be connected to the fourth control group 144 and the fourth electronic device 154 that performs fourth CAN communication.

The fifth communication module 125 may be detachably connected to the diagnostor 2 that performs fifth CAN communication. The diagnostor 2 may be a device managed by a service center or a workshop.

The first control group 141 may include the plurality of controllers for controlling the first electronic device 151 and the second control group 142 may include the plurality of controllers for controlling the second electronic device 152. The third control group 143 may include the plurality of controllers for controlling the third electronic device 153 and the fourth control group 144 may include the plurality of controllers for controlling the fourth electronic device 154.

In some forms of the present disclosure, the number of electronic devices controlled by each of the control groups is one, but the number of electronic devices controlled by each of the control groups may be two or more.

A connection structure of the CAN communication between the plurality of communication modules, the plurality of control groups and the plurality of loads will be described the first and second control groups and the first and second electronic devices connected to the first and second communication modules among the plurality of communication modules, the plurality of control groups and the plurality of loads as the example.

An example in which the first communication module 121 and the second communication module 122 are provided in the gateway 120a will be described.

Figure 3:
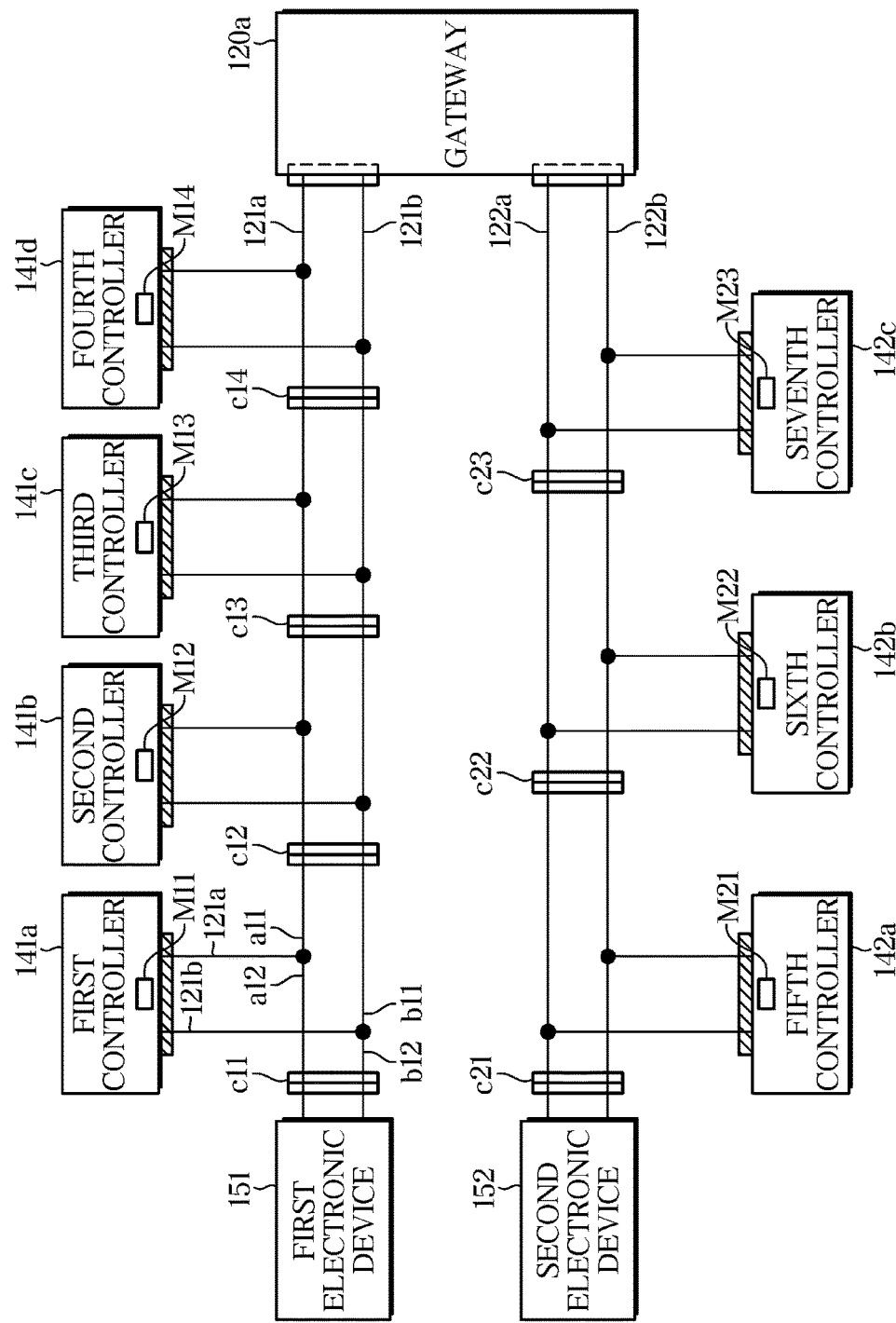
FIG. 3 is a view illustrating communication connection between the communicator provided in the vehicle and the plurality of controllers in one form of the present disclosure.

As illustrated in FIG. 3, the first communication module 121 in the gateway 120a may include a first high line 121a and a first low line 121b for the first CAN communication. The first electronic device 151 may be connected to one side of the first high line 121a and the first low line 121b of the first communication module 121 and the gateway 120a may be connected to the other side.

A first connector C11 may be connected to the first high line 121a and the first low line 121b connected to the first electronic device 151. The first connector C11 may be connected to a first controller 141a and a second connector C12 and may be connected to the first controller 141a and the second connector C12 through the first high line 121a and the first low line 121b.

The second connector C12 may be connected to a second controller 141b and a third connector C13 and may be connected to the second controller 141b and the third connector C13 through the first high line 121a and the first low line 121b.

The third connector C13 may be connected to a third controller 141c and a fourth connector C14 and may be connected to the third controller 141c and the fourth connector C14 through the first high line 121a and the first low line 121b.

The fourth connector C14 may be connected to a fourth controller 141d and the gateway 120a and may be connected to the fourth controller 141d and the gateway 120a through the first high line 121a and the first low line 121b.

That is, the plurality of controllers disposed between the first electronic device 151 and the gateway 120a may be disposed between the first electronic device 151 and the gateway 120a by the plurality of connectors C11 to C14.

The second communication module 122 in the gateway 120a may include a second high line 122a and a second low line 122b for the second CAN communication. The second electronic device 152 may be connected to one side of the second high line 122a and the second low line 122b of the second communication module 122 and the gateway 120a may be connected to the other side.

A fifth connector C15 may be connected to the second high line 122a and the second low line 122b connected to the second electronic device 152. The fifth connector C15 may be connected to a fifth controller 142a and a sixth connector C22 and may be connected to the fifth controller 142a and the sixth connector C22 through the second high line 122a and the second low line 122b.

The sixth connector C22 may be connected to a sixth controller 142b and a seventh connector C23 and may be connected to the sixth controller 142b and the seventh connector C23 through the second high line 122a and the second low line 122b.

The seventh connector C23 may be connected to a seventh controller 142c and the gateway 120a and may be connected to the seventh controller 142c and the gateway 120a through the second high line 122a and the second low line 122b.

That is, the plurality of controllers disposed between the second electronic device 152 and the gateway 120a may be disposed between the second electronic device 152 and the gateway 120a by the plurality of connectors C21 to C23.

The wire connection structures of the CAN communication of the plurality of controllers of the first and second control groups 141 and 142 may be identical to each other. Therefore, the wire connection structure of the CAN communication of the first controller will be described as an example.

The first high line 121a and the first low line 121b may be connected to the communication end of the first controller 141a. The first connector C11 may be provided at a first high branch a11 branched from the first high line 121a connected to the communication end of the first controller and a first low branch b11 branched from the first low line 121b. The second connector C12 may be provided at a second high branch a12 branched from the first high line 121a and a second low branch b12 branched from the first low line 121b.

The first connector C11 connected to the first high branch a11 and the first low branch b11 may be an insertion type connector. The second connector C12 connected to the second high branch a12 and the second low branch b12 may be a receptacle type connector.

The first high line 121a and the first low line 121b connected to the communication end of the first controller may also be connected by the connector.

The gateway 120a may also include the communication end to which two wires of the CAN communication module are connected. The number of communication ends of the gateway 120a may be plural.

Each of the controllers of the first and second control groups may perform more stable control while performing organic sharing with the other controller by network signaling of the detection signal of the detector and the control signal of the electronic device, which are controlled by the controller, through the CAN communication module.

The plurality of controllers 141a, 141b, 141c, and 141d of the first control group may control at least one function performed by the first electronic device 151. Each of the controllers may control the operation of the first electronic device 151 individually or in conjunction with each other by executing the stored program.

The plurality of controllers 141a, 141b, 141c and 141d of the first control group may include memories M11, M12, M13 and M14 for storing the error information, respectively. That is, each of the controllers may have a built-in memory.

The memories M11, M12, M13, and M14 of the plurality of controllers 141a, 141b, 141c, and 141d may store arrangement information with respect to the other controllers and the gateway in the first control group, respectively.

For example, in the memory M11 of the first controller 141a, the arrangement information of the order of the second controller 141b, the third controller 141c, the fourth controller 141d, and the gateway 120a may be stored. The order may be the transmission order of the communication signal for error diagnosis when the communication error occurs.

In the memory M12 of the fifth controller 142a, the arrangement information of the order of the first controller 141a, the third controller 141c, the fourth controller 141d, and the gateway 120a may be stored.

The plurality of controllers 142a, 142b, and 142c of the second control group may control at least one function performed by the second electronic device 152. Each of the controllers may control the operation of the second electronic device 152 individually or in conjunction with each other by executing the stored program.

The plurality of controllers 142a, 142b, and 142c of the second control group may include memories M21, M22, and M23 for storing the error information, respectively.

The memories M21, M22, and M23 of the plurality of controllers 142a, 142b, and 142c may store arrangement information with respect to the other controllers and the gateway in the second control group, respectively. The order may be the transmission order of the communication signal for error diagnosis when the communication error occurs.

The gateway 120a may transmit and receive control signals between the first control group 141 and the second control group 142.

Each of the controllers in the first control group 141 may determine whether or not the communication error has occurred when it is determined that the vehicle is in the driving state. When it is determined that the communication error has occurred, the communication may be performed with the other controllers and the gateway in the first control group, the error code for the communication error may be recognized based on the transmission/reception signal, and the information about the transmission/reception signal and the error code may be stored in the built-in memory. Each of the controllers of the first control group 141 may determine the device on which the communication error has occurred and store the identification information about the determined device.

The first controller 141a may store the transmission/ reception information and the error code of the signal with the second controller, the third controller, the fourth controller and the gateway 120a in the built-in first memory, and may further store the identification information of the controller in which the error has occurred.

Each of the controllers in the second control group 142 may determine whether or not the communication error has occurred when it is determined that the vehicle is in the driving state. When it is determined that the communication error has occurred, the communication may be performed with the other controllers and the gateway in the second control group, the error code for the communication error may be recognized based on the transmission/reception signal, and the information about the transmission/reception signal and the error code may be stored in the built-in memory. Each of the controllers of the second control group 142 may determine the device on which the communication error has occurred and store the identification information about the determined device.

For example, the fifth controller 142a may store the transmission/reception information and the error code of the signal with the sixth controller, the seventh controller and the gateway 120a in the fifth memory M21, and may further store the identification information of the controller in which the error has occurred.

Each of the controllers in the first and second control groups may transmit the error information stored in the built-in memory to the diagnostor 2 when an error information transmission command is received from the diagnostor 2.

The error occurrence determination and the transmission structure of the error information of the plurality of controllers in the plurality of control groups may be the same. An example of the configuration in which the first controller determines the error occurrence and stores and transmits the error information will be described in more detail.

When the communication signal for error diagnosis is received from the controller or the gateway of any one of the second controller, the third controller, and the fourth controller in the first control group, the first controller 141a may transmit the response signal to the device that transmitted the communication signal.

When the control signal is not received from any one of the controllers or the gateway in the first control group 141 for the predetermined time, the first controller 141a may sequentially transmit the communication signal of the preset number of times to the plurality of controllers and the gateway in the first control group 141, at preset time intervals, and store the number of times of reception of the response signal for each of the plurality of controllers and the gateway in the first control group 141 when the response signal is received from at least one of the devices.

The first controller 141a may identify the device having the number of times of reception of the response signals among the plurality of controllers and the gateway in the first control group 141 is less than the preset number of times, recognize the position of the connector where the connection failure occurred based on the identified position information of the device, and store the error code as the time-out when the number of times of reception of the response signals of some of the plurality of controllers or the gateway is the preset number of times.

When the number of times of reception of the response signals of the plurality of controllers and the gateway 120a in the first control group 141 is out of the reference error range and is different from each other, the first controller 141a may determine the error code as the time-out.

When the response signal is not received from the plurality of controllers and the gateway 120a in the first control group 141, the first controller 141a may determine the error code as the bus off.

When the number of times of reception of the response signals of the plurality of controllers and the gateway 120a in the first control group 141 is less than the preset number of times and the number of times of reception of the response signals of the plurality of controllers and the gateway are all the same or similar, the first controller 141a may determine the error code as the bus off.

Here, the similarity of the number of times of reception of the response signals may indicate that the number of times of reception of the response signals of the plurality of controllers and the gateway 120a is different within the reference error range.

When the number of times that the response signals of three of the controllers and the gateway for the communication signal transmitted ten times is all three times, the first controller 141a may determine that the communication error is about the bus off. When the number of times of reception of the response signals of two of the controllers is three times and the number of times of reception of the response signals of the gateway 120a is four times and the number of times of reception of the response signal of one of the controllers is two times, the first controller 141a may determine that the error code is about the bus off.

When a message about state information different from the actual state of the vehicle 1 is received from the at least one of the controllers in the first control group 141 or the message about detection information that is out of the normal range is received, the first controller 141a may store the error code as the message error. The normal range may be a range that can be output from the detector provided in the vehicle 1, or a range that can be output from the vehicle 1.

The first controller 141a may sequentially transmit the communication signal to the plurality of controllers and the gateway in the first control group, receive the response signal for each of the plurality of controllers and the gateway in the first control group, determine the device that generated the message error based on the received response signal, and store the information of the determined device.

The first controller 141a may transmit the communication signal from the device disposed closest to the first controller 141a.

The plurality of controllers and the gateway may be collectively referred to as devices.

When it is determined that the message error occurs, the first controller 141a may transmit the predetermined number of communication signals to the plurality of controllers and the gateway in the first control group at preset time intervals. When the response signal is received from the at least one of the controllers and the gateway 120a in the first control group 141, the first controller 141a may identify the number of times of reception of the received response signal for each device, store the number of times of reception of the identified response signal for each device, determine the device that the message error occurs based on the number of times of the stored response signal for each device, and store the information of the determined device.

The first controller 141a may transmit the error information stored in the first memory when the error information transmission command is received from the main controller or the diagnostor 2.

The first controller 141a may transmit the error information stored in the first memory to a freeze frame when the error information transmission command is received from the diagnostor 2.

The control configuration of the third controller 141c in the first control group will be briefly described.

The third controller 141c of the first control group may transmit the response signal to the device that has transmitted the communication signal when the communication signal for error diagnosis is received from the first controller.

When the control signal is not received for the predetermined time while the vehicle 1 is driving, the third controller 141c may sequentially transmit the preset number of communication signals in the preset time interval in the order of the fourth controller, the gateway, the second controller, and the first controller.

When the response signal is received from at least one of the devices, the third controller 141c may store the number of times of reception of the response signal for each of the first, second and fourth controllers and the gateway 120a in the first control group 141, recognize the error code based on the number of times of reception of the response signal, and store the recognized error code.

In addition, the third controller 141c may transmit the communication signal in the order of the second controller→the first controller→the fourth controller→the gateway. The order may be determined based on the transmission order of communication signals stored in the memory of the third controller 141c.

At least one component may be added or deleted corresponding to the performance of the components of the vehicle 1 illustrated in FIGS. 1, 2, and 3. It will be readily understood by those skilled in the art that the mutual position of the components may be changed corresponding to the performance or structure of the vehicle 1.

In the meantime, each of the components shown in FIGS. 1, 2 and 3 may be referred to as a hardware component such as software and/or a field programmable gate array (FPGA) and an application specific integrated circuit (ASIC).

Figure 4:
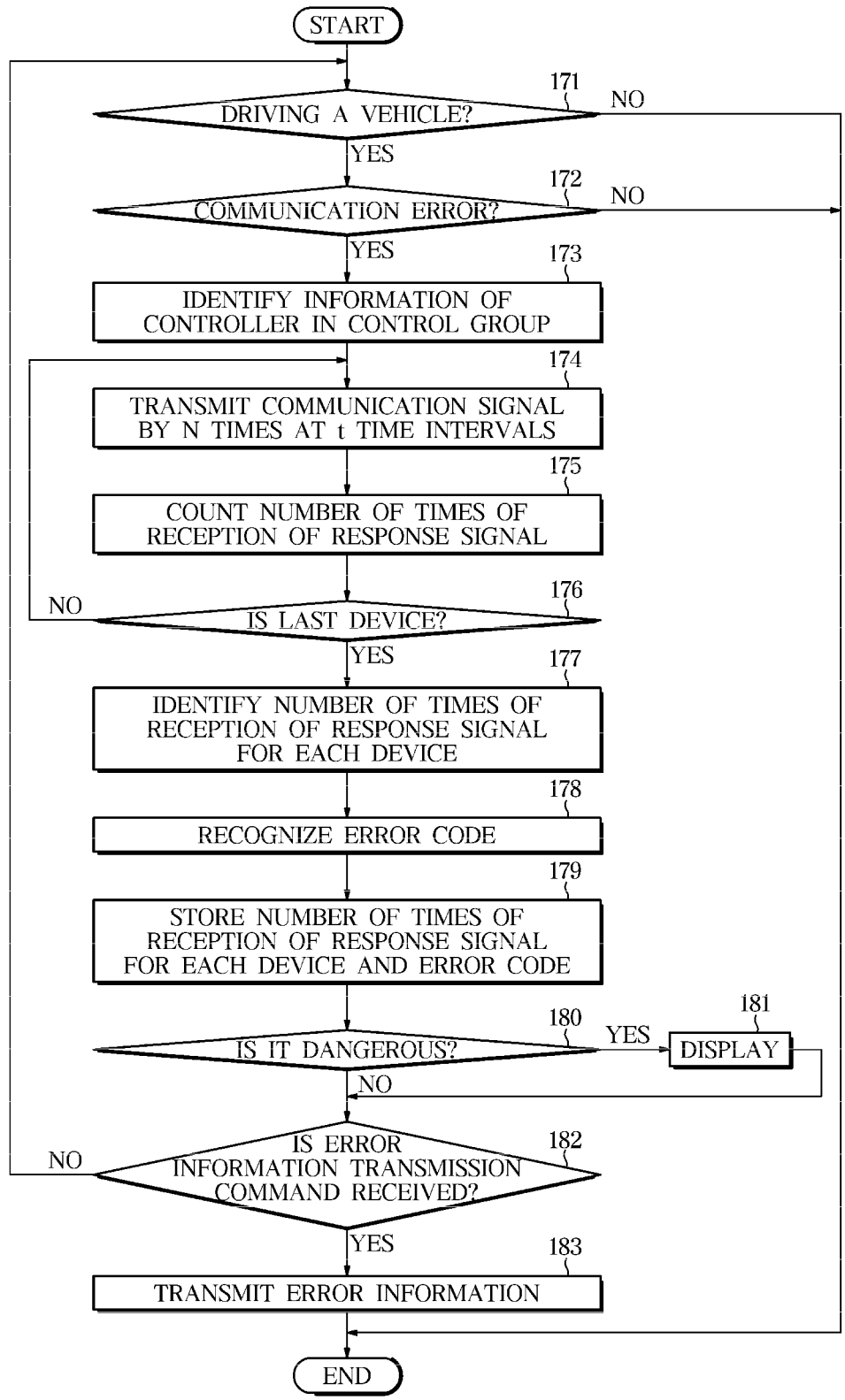
FIG. 4 is a control flowchart of the vehicle in one form of the present disclosure.

FIG. 4 is a control flowchart of the vehicle in one form of the present disclosure, and will be described with reference to FIGS. 5 to 10.

Each of the controllers of the plurality of control groups provided in the vehicle 1 may share information with each other and control the operation of various loads.

For example, the first controller 141a, the second controller 141b, the third controller 141c, the fourth controller 141d, and the gateway 120a of the first control group may transmit and receive control signals, and generate control signals for controlling the operation of the first electronic device 151 using the control signals of the other devices, respectively, and output the generated control signals.

The plurality of controllers and the gateways of the first control group may share control parameters and detection information in addition to control signals.

More particularly, the first controller 141a may periodically receive the shared information from the second controller 141b, the third controller 141c, the fourth controller 141d, and the gateway 120a.

Each of the controllers of the plurality of control groups provided in the vehicle 1 may determine whether the vehicle 1 is in the driving state, and determine whether or not the communication error occurs when it is determined that the vehicle 1 is in the driving state.

The determination of whether or not the communication error has occurred may include determining that the communication error has occurred when the control signal is not received from the other controller of the same control group for the predetermined time.

In addition, the fact that the control signal is not received from the other controller of the same control group for the predetermined time may include that there is the state in which the communication is impossible for the predetermined time.

The fact that the control signal is not received from the other controller of the same control group for the predetermined time may include that the connection failure or short circuit has occurred in the connector of the CAN communication module that connects the plurality of controllers in the same control group.

The determination of whether or not the communication error has occurred may include determining that the communication error has occurred when the message for state information different from the actual state of the vehicle is received from the other controller in the same control group or the message for detection information that is out of the normal range is received.

The controller, which has determined that the control signal has not been received for the predetermined time, may determine that the communication error has occurred, and recognize the controller in which the communication error has occurred and the error code.

An example in which the control signal is not received in the first controller will be described.

The first controller determines that the vehicle 1 is in the driving state (171), and may determine whether the communication error has occurred (172).

If it is determined that the communication error has occurred, the first controller may identify the identification information and the arrangement information of the other controller in the first control group stored in the memory M11 of the first controller (173).

At this time, the first controller may identify the transmission order of communication signals for error diagnosis stored in the memory, and may sequentially transmit the communication signals to the second, third, and fourth controllers and the gateway based on the transmission order of the identified communication signals.

The first controller may sequentially transmit the communication signal to the second, third, and fourth controllers and the gateway sequentially by the preset number of times (N times) at preset time intervals (t time) (174).

Here, the preset number of times may be ten times.

When the first controller receives a response signal from at least one of the second, third, and fourth controllers and the gateway, the first controller counts the number of times of reception of the received response signal received (175). At this time, the response signal received by the first controller may be received in the order of the second controller, the third controller, the fourth controller, and the gateway in accordance with the transmission order of the communication signal.

The first controller may determine whether the device transmitting the communication signal is the last device. When it is determined that the device transmitting the communication signal is the last device (176), the first controller may identify the number of times of reception of the response signal for each device after the predetermined time elapses (177), and recognize the error code based on the number of times of reception of the identified response signal for each device (178).

The determination of whether the predetermined time has elapsed when it is determined that the device transmitting the communication signal is the last device, is for determining whether or not the time for receiving the response signal from the last device has passed.

In other words, the first controller may not receive the response signal from the last device, but since the response signal may be received from the last device, when the time for receiving the response signal securely reaches the last device elapses, the first controller may identify the number of times the response signal is received for each device.

Figure 5:
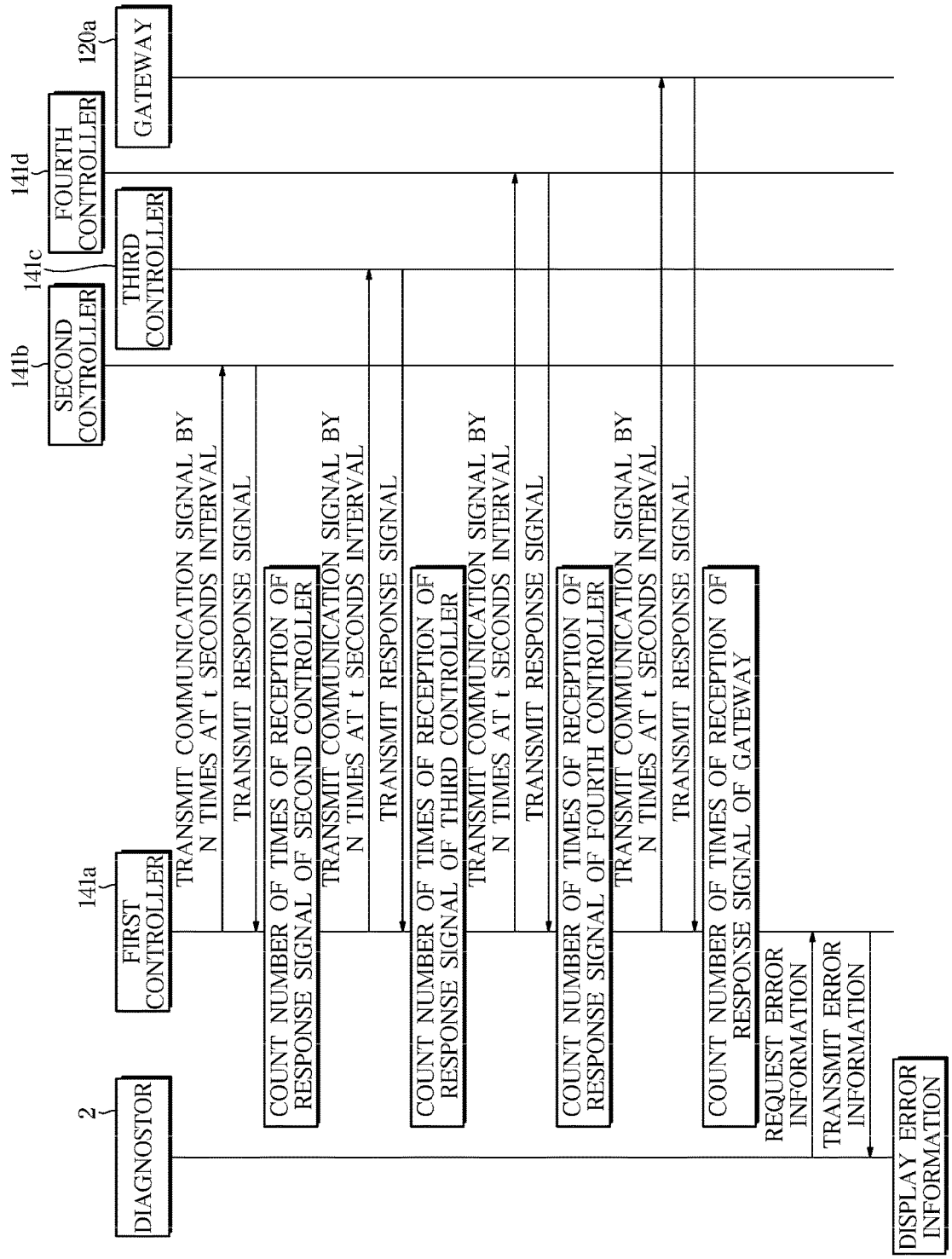
FIG. 5 is a view illustrating transmission and reception of a communication signal and a response signal for diagnosing a communication error of the vehicle in one form of the present disclosure.

As illustrated in FIG. 5, the first controller 141*a* may transmit the communication signal to the second controller 141*b* by the preset number of times (N times) at preset time intervals (t time) based on the transmission order of communication signals stored in the memory M11.

The first controller 141*a* may count the number of times of reception of the response signal when the response signal is received from the second controller 141*b* after transmitting a first communication signal to the second controller 141*b*. The first controller 141*a* may transmit a second communication signal to the second controller 141*b* when the time t elapses from the time when the first communication signal is transmitted to the second controller 141*b*, and when the response signal is received from the second controller, may count the number of times the response signal is received two times.

The first controller 141*a* may maintain the number of times of reception of the response signal two times when the response signal is not received from the second controller 141*b* after transmitting a third communication signal to the second controller 141*b*. The first controller 141*a* may transmit a fourth communication signal to the second controller 141*b* when the time t elapses from the time when the third communication signal is transmitted to the second controller 141*b*, and when the response signal is received from the second controller, may count the number of times the response signal is received three times.

In this manner, the first controller may transmit the communication signal to the second controller by the preset number of times, identify whether or not the response signal is received each time the communication signal is transmitted, and increase the count each time a response signal is received, and count the number of times of the response signal of the second controller is received by incrementing the count each time the response signal is received.

When the communication with the second controller is terminated, the first controller may transmit the communication signal to the third controller 141*c* by the preset number of times (N times) at preset time intervals (t time).

The first controller may count the number of times the response signal of the third controller 141*c* is received in the same manner as the second controller 141*b*.

When the communication with the third controller is terminated, the first controller may transmit the communication signal to the fourth controller 141*d* by the preset number of times (N times) at preset time intervals (t time).

The first controller may count the number of times the response signal of the fourth controller 141*d* is received in the same manner as the second controller 141*b*.

When the communication with the fourth controller is terminated, the first controller may transmit the communication signal to the gateway 120*a* by the preset number of times (N times) at preset time intervals (t time).

The first controller may count the number of times the response signal of the gateway 120*a* is received in the same manner as the second controller.

When the first controller determines that the communication with the gateway 120*a* as the last device has been terminated, the first controller may identify receipt times of the response signals of the second, third and fourth controllers and the gateway and recognize the error code based on the identified receipt times.

The configuration for recognizing the error code will be described in more detail.

The first controller 141*a* may identify whether there is the device in which the number of times the response signal is received is less than the preset number of times of the plurality of controllers and the gateway in the first control group 141.

The first controller may recognize the error code as the time-out when it is determined that the number of times of reception of the response signals of the devices of the second, third and fourth controllers and the gateway is the preset number and the number of times of reception of the response signal of the remaining device is less than the preset number.

The first controller 141a may identify the identification information of the device having the number of times of reception of the response signal less than the preset number of times, identify the position information of the device having the identified identification information, and recognize the position of the connector where the connection failure occurs based on the position information of the identified device.

The first controller 141a may recognize the error code as the time-out when the number of times of reception of the response signals of the second, third and fourth controllers and the gateway 120a in the first control group are different from each other and the difference is out of the reference error range.

The first controller 141a may recognize the error code as the bus off when it is determined that no response signal is received from the second, third, and fourth controllers in the first control group and the gateway 120a.

In addition, when the number of times of reception of the response signals of the second, third and fourth controllers in the first control group 141 and the gateway 120a is less than the preset number of times and the number of times of reception of the response signals of the plurality of controllers and the gateway are all the same or similar, the first controller 141a may determine the error code as the bus off.

Here, the similarity of the number of times of reception of the response signals may indicate that the number of times of reception of the response signals of the plurality of controllers and the gateway 120a is different within the reference error range.

When the number of times that the response signals of three of the controllers and the gateway for the communication signal transmitted ten times is all three times, the first controller 141a may determine that the communication error is about the bus off. When the number of times of reception of the response signals of two of the controllers is three times and the number of times of reception of the response signals of the gateway 120a is four times and the number of times of reception of the response signal of one of the controllers is two times, the first controller 141a may determine that the error code is about the bus off.

When a message about state information different from the actual state of the vehicle 1 is received from the at least one of the controllers in the first control group 141 or the message about detection information that is out of the normal range is received, the first controller 141a may recognize the error code as the message error. At this time, the transmission order of the communication signal for error diagnosis stored in the memory may be identified, and the communication signal may be sequentially transmitted to the second, third, and fourth controllers and the gateway based on the transmission order of the identified communication signal.

The first controller may sequentially transmit the communication signal to the second, third, and fourth controllers and the gateway sequentially by the preset number of times (N times) at preset time intervals (t time) (174).

The first controller may sequentially transmit the communication signal to the second, third, and fourth controllers and the gateway by the preset number of times (N times) at preset time intervals (t time), identify the number of times of reception of the sequentially received response signals for each device, and identify the message information corresponding to the device-specific response signal.

The first controller may recognize whether the message error due to the communication error or the message error due to a controller error is detected based on the number of times of reception of the response signals for each device and the message information.

When it is determined that the message error is caused by the communication error, the first controller may recognize the position where the communication error has occurred based on the number of times of reception of the response signal for each device.

When the first controller determines that the communication with the gateway, which is the final device, has been completed, the first controller may store the number of times of reception of the response signals of the second, third and fourth controllers and the gateway and the error code in the memory M11 (179).

When it is determined that error code is recognized, the first controller may store the number of times of reception of the response signals of the second, third and fourth controllers and the gateway and the error code in the memory M11 (179).

The first controller may also store information about the position where the communication error occurred.

As illustrated in FIG. 6A, the first controller may store the number of times of reception of the response signals received at the second controller, the third controller, the fourth controller, and the gateway, which are communication targets.

For example, as illustrated in FIG. 6A, when the number of times of reception of the response signal of the second controller is counted by ten times, the number of times of reception of the response signal of the third controller is counted by ten times, the number of times of reception of the response signal of the fourth controller is counted by two times, and the number of times of reception of the response signal received by the gateway is counted by one when the communication signal for diagnosing the communication error is transmitted ten times to each device, the first controller may determine that there is a possibility of connection failure of the connector between the third controller and the fourth controller and recognize the error code as the time-out based on this.

When it is determined that the communication error has occurred because the first controller of the first control group does not receive the control signal for the predetermined time, at least one of the other controllers in the first group, which is the same group, may not receive the control signal for the predetermined time.

Accordingly, the controller in the first control group that has not received the control signal for the predetermined time may perform an attempt to communicate with the other controller to diagnose the communication error. The fourth controller and the gateway will be described as an example.

As illustrated in FIG. 6B, the fourth controller may receive the response signal from at least one of the third controller, the second controller, the first controller and the gateway by sequentially transmitting the predetermined number of communication signals to the third controller, the second controller, the first controller, and the gateway in the predetermined time interval based on the transmission order of the communication signals stored in the memory M14, and may count and store the number of times of reception of the response signal for each device.

For example, as illustrated in FIG. 6B, when the number of times of reception of the response signal of the third controller is counted by one, the number of times of reception of the response signal of the second controller is counted by one, the number of times of reception of the response signal of the first controller is counted by three times, and the number of times of reception of the response signal received by the gateway is counted by ten times when the communication signal for diagnosing the communication error is transmitted 10 times to each device, the fourth controller may determine that there is a possibility of connection failure of the connector between the third controller and the fourth controller and recognize the error code as the time-out based on this.

As illustrated in FIG. 6C, the gateway may receive the response signal from at least one of the fourth controller, the third controller, the second controller and the first controller by sequentially transmitting the predetermined number of communication signals to the fourth controller, the third controller, the second controller, and the first controller in the predetermined time interval based on the transmission order of the communication signals stored in the memory (not shown), and may count and store the number of times of reception of the response signal for each of the controllers.

For example, as illustrated in FIG. 6C, when the number of times of reception of the response signal of the fourth controller is counted by ten times, the number of times of reception of the response signal of the third controller is counted by three times, the number of times of reception of the response signal of the second controller is counted by two times, and the number of times of reception of the response signal of the first controller is counted by one when the communication signal for diagnosing the communication error is transmitted 10 times to each device, the gateway may determine that there is a possibility of connection failure of the connector between the third controller and the fourth controller and recognize the error code as the time-out based on this.

As illustrated in FIG. 7, when the number of times of reception of the response signal of the second controller is counted by three times, the number of times of reception of the response signal of the third controller is counted by three times, the number of times of reception of the response signal of the fourth controller is counted by three times, and the number of times of reception of the response signal of the gateway is counted by three times when the communication signal for diagnosing the communication error is transmitted 10 times to each device, the first controller may determine that there is a possibility of short circuit in the first communication module and recognize the error code as the bus off based on this.

The first controller may determine the danger level based on the error information (180), and display the error information through the display when the danger level is at the upper level among the upper, middle, and lower danger levels (181), thereby allowing the user to visit the service center.

The first controller may store the error information in the memory M11 when it is determined that the danger level is at the middle level or the lower level among the upper, middle, and lower danger levels.

In addition, the first controller may transmit the error information to the main controller 130 and store the error information in the storage 131.

Also, the first controller may identify the error information stored in the memory M11, and display the error information through the display when it is determined that the currently generated error information is equal to or higher than the reference number.

The first controller may transmit the error information stored in the memory M11 to the diagnostor 2 when the error information transmission command is received from the diagnostor 2 (182).

As shown in FIG. 8, the diagnostor 2 may display the error information transmitted from the first controller. Here, the error information may include the number of times of reception of the response signal and the error code in the communication between the first controller and the other device.

That is, the diagnostor 2 may display the number of times of reception of the response signal and the error code in the communication between the first stage device and the other device.

At this time, a mechanic may identify the position of the connector where the connection failure occurred based on the communication information of the first controller and the other device displayed on the screen of the diagnostor, that is, the number of times of reception of the response signal.

In addition, the diagnostor may recognize the error code based on the number of times of reception of the response signal of each device from the first controller and display the recognized error code.

Also, the second, the third, and the fourth controllers and the gateway may also transmit the error information stored in each built-in memory to the diagnostor 2 when the error information transmission command is received from the diagnostor 2 (182).

As illustrated in FIG. 9, the diagnostor 2 may display the number of times of reception of the response signal and the error code in the communication between the first controller and the other device, the number of times of reception of the response signal and the error code in the communication between the second controller and the other device, the number of times of reception of the response signal and the error code in the communication between the third controller and the other device, the number of times of reception of the response signal and the error code in the communication between the fourth controller and the other device, and the number of times of reception of the response signal and the error code in the communication between the gateway and the plurality of controllers.

At this time, the mechanic may identify the connection failure and short circuit between the controllers and easily identify the message error or the like by identifying the communication state of the plurality of controllers of the first control group for controlling the first electronic device.

As is apparent from the above description, some forms of the present disclosure allow the controller to diagnose the connection error or message error itself and store the diagnostic information as soon as the connection error or message error between the controllers during the driving of the vehicle or intermittently occurs, and to transmit the stored diagnosis information to the diagnostor when the diagnostor is connected so that the mechanic can easily and quickly check the diagnostic information through the diagnostor, and the error can be confirmed conveniently. Therefore, it may be possible to minimize the error diagnosis and repair time of the vehicle. At this time, the reliability of the service center by the user can be improved.

Further, the present disclosure can prevent the increase of the manufacturing cost since the error diagnosis of the vehicle can be performed only by updating the software without changing the hardware of the diagnostor and the controller.

According to the present disclosure, when the risk is high at the time of the error diagnosis, the error information is output so that the user can recognize the danger and visit the service center quickly, thereby improving the safety for the user. That is, the vehicle provides the user with the error information of controller error and the CAN connection error between the controllers, thereby preventing an accident that may occur and preventing physical and material damage.

The present disclosure can improve the quality of the communication module and the vehicle, further increase the satisfaction of the user, and improve the convenience of the user.

Meanwhile, some forms of the present disclosure may be implemented in the form of recording media for storing instructions to be carried out by a computer. The instructions may be stored in the form of program codes, and when executed by a processor, may generate program modules to perform an operation in some forms of the present disclosure. The recording media may correspond to computer-readable recording media.

The computer-readable recording medium includes any type of recording medium having data stored thereon that may be thereafter read by a computer. For example, it may be a Read Only Memory (ROM), a Random Access Memory (RAM), a magnetic tape, a magnetic disk, a flash memory, an optical data storage device, and the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
   a plurality of controllers configured to control operation of at least one load and share information with each other;
   a communicator configured to communicate between the at least one load and the plurality of controllers, wherein the communicator is connected to the at least one load and the plurality of controllers through a communication line; and
   a plurality of connectors provided among the plurality of controllers, the at least one load, and the communicator, wherein the plurality of connectors is configured to connect the plurality of controllers, the at least one load, and the communicator,
   wherein a controller of the plurality of controllers is configured to:
      transmit communication signals for a preset number of times to another controller of the plurality of controllers and the communicator when the information is not received for a predetermined amount of time while the vehicle is driving;
      store a number of times that received the transmitted communication signals as error information; and
      transmit the error information to an outside when receiving an error information transmission command from the outside,
   wherein the plurality of controllers comprises:
      a memory configured to:
         store identification information of the plurality of controllers and identification information of the communication modules; and
         store arrangement information of the plurality of controllers and the communicator and a transmission order of the communication signals; and
      at least three controllers of the plurality of controllers, and
      wherein the controller of the plurality of controllers is configured to sequentially transmit the preset number of times to at least two controllers of the plurality of controllers and the communicator based on the transmission order of the communication signals.

2. The vehicle according to claim 1, wherein the communicator is configured to:
   communicate with a diagnostor; and
   transmit the error information to the diagnostor.

3. The vehicle according to claim 1, wherein the controller of the plurality of controllers is configured to:
   count the number of times that a response signal is received from at least one of at least two controllers of the plurality of controllers or the communicator; and
   recognize and store an error code based on a first number of times and a second number of times, wherein the first number of times is the number of times that received the response signal from the at least two controllers of the plurality of controllers, and the second number of times is the number of times that received the response signal from the communicator.

4. The vehicle according to claim 3, wherein the communicator is configured to communicate with the diagnostor, and
   wherein any controller of the plurality of controllers is configured to transmit, to the diagnostor, the first number of times, the second number of times, and the recognized error code when the error information transmission command is received from the diagnostor.

5. The vehicle according to claim 3, wherein the controller of the plurality of controllers is configured to:
   identify, from the first number of times and the second number of times, a device having the number of times received the response signal that is less than the preset number of times; and
   determine a connector that generated a communication error based on identification information of the identified device and the arrangement information.

6. The vehicle according to claim 3, wherein the controller of the plurality of controllers is configured to:
   recognize the error code as a bus off when the first number of times and the second number of times are less than the preset number of times, and the first number of times is equal to the second number of.

7. The vehicle according to claim 3, wherein the controller of the plurality of controllers is configured to:
   recognize the error code as a time-out when the first number of times and the second number of times are less than the preset number of times, and an error range of the first number of times and the second number of times exceeds a predetermined error range.

8. The vehicle according to claim 3, wherein the controller of the plurality of controllers is configured to:
   recognize the error code as the time-out when a portion from the first number of times and the second number of times is less than the preset number of times.

9. The vehicle according to claim 3, wherein the vehicle further comprises:
a detector configured to detect a state of the vehicle,
wherein the controller of the plurality of controllers is configured to:
recognize the error code as a message error when detection information is out of a normal range; and
recognize the error code as the message error when state information is different from an actual state of the vehicle.

10. The vehicle according to claim 1, wherein the vehicle further comprises:
a display,
wherein the controller of the plurality of controllers is configured to:
determine a danger level of communication error based on the error information;
control the display to display the error information when the danger level of the communication error is equal to or greater than a predetermined level;
identify a number of times that received the error information; and
control the display to display the error information when the identified number of times is equal to or greater a predetermined number of times.

11. A method for controlling a vehicle including a plurality of controllers each connected through a connector to a communication line between at least one load and a gateway, the method comprising:
controlling operation of the at least one load by sharing information between the plurality of controllers during a driving of the vehicle;
recognizing error information when it is determined that a communication error has occurred in at least one controller of the plurality of controllers or the gateway; and
transmitting, to a diagnostor, the error information when an error information transmission command is received from the diagnostor,
wherein recognizing the error information comprises:
recognizing the error information by the controller of the plurality of controllers that has not received the information for a predetermined amount of time, and
wherein the controller of the plurality of controllers that has not received the information for the predetermined amount of time is configured to:
transmit a preset number of times of communication signals to another controller of the plurality of controllers and the gateway;
count a number of times of that received a response signal from the another controller of the plurality of controllers and the number of times that received the response signal from the gateway;
recognize an error code based on the counted number of times that received the response signal from the another controller of the plurality of controllers and the gateway; and
store the counted number of times that received the response signal from the another controller of the plurality of controllers and the gateway and the recognized error code as the error information,
wherein recognizing the error code comprises:
counting a first number of times that received the response signal from at least two controllers of the plurality of controllers and a second number of times that received the response signal from the gateway;
recognizing the error code as a bus off when the first number of times and the second number of times are less than the preset number of times, and the first number of times is equal to the second number of times; and
recognizing the error code as a time-out when a portion from the first number of times and the second number of times is less than the preset number of times.

12. The method according to claim 11, wherein the plurality of controllers comprises at least three controller of the plurality of controllers, and
wherein transmitting the preset number of times of communication signals comprises:
sequentially transmitting, with the controller of the plurality of controllers, the preset number of times of communication signals to at least two controllers of the plurality of controllers or the gateway based on a transmission order of the communication signals stored in a memory.

13. The method according to claim 11, wherein recognizing the error code comprises:
recognizing the error code as the time-out when the first number of times and the second number of times are less than the preset number of times, and an error range of the first number of times and the second number of times exceed a predetermined error range.

14. The method according to claim 11, wherein the method further comprises:
identifying, from the first number of times and the second number of times, a device having the number of times received the response signal that is less than the preset number of times; and
determining a connector that generated a communication error based on identification information of the identified device and arrangement information.

15. The method according to claim 11, wherein recognizing the error code comprises:
detecting an actual state of the vehicle;
recognizing the error code as a message error when the detected actual state of the vehicle is out of a normal range; and
recognizing the error code as the message error when state information is different from the actual state of the vehicle.

16. A vehicle comprising:
at least one load;
a gateway connected to the at least one load through a communication line;
each controller of a plurality of controllers connected through a connector to the communication line and configured to control the at least one load; and
a memory configured to store arrangement information of the plurality of controllers and the gateway,
wherein at least one controller of the plurality of controllers is configured to:
transmit communication signals to another controller of the plurality of controllers and the gateway when the communication is impossible for a predetermined amount of time;
identify number of times that received a response signal from the another controller of the plurality of the controllers and the gateway;
determine a position of the connector that a connection error has occurred based on the identified number of times and the arrangement information; and
store the determined position of the connector, wherein the memory is configured to store identification information of the plurality of controllers, identification information of the gateway and a transmission order of communication signals, and wherein the at least one controller of the plurality of controllers is configured to:

sequentially transmit the preset number of times of communication signals to the another controller of the plurality of controllers and the gateway based on the transmission order of the communication signals;

recognize an error code as a bus off when a first number of times that received the response signal from the another controller of the plurality of controllers is equal to a second number of times that received the response signal from the gateway; and recognize the error code as a time-out when the first number of times is not equal to the second number of times.

17. The vehicle according to claim 16, wherein the at least one controller of the plurality of controllers is configured to:

recognize the error code based on the identified number of times;

store the recognized error code as error information; and transmit to a diagnostor the position of the connector that a connection error has occurred and the error code when an error information transmission command is received from the diagnostor.

* * * * *